(No Model.)
G. W. ODGERS.
BOILER TUBE CUTTER.
No. 325,438. Patented Sept. 1, 1885.
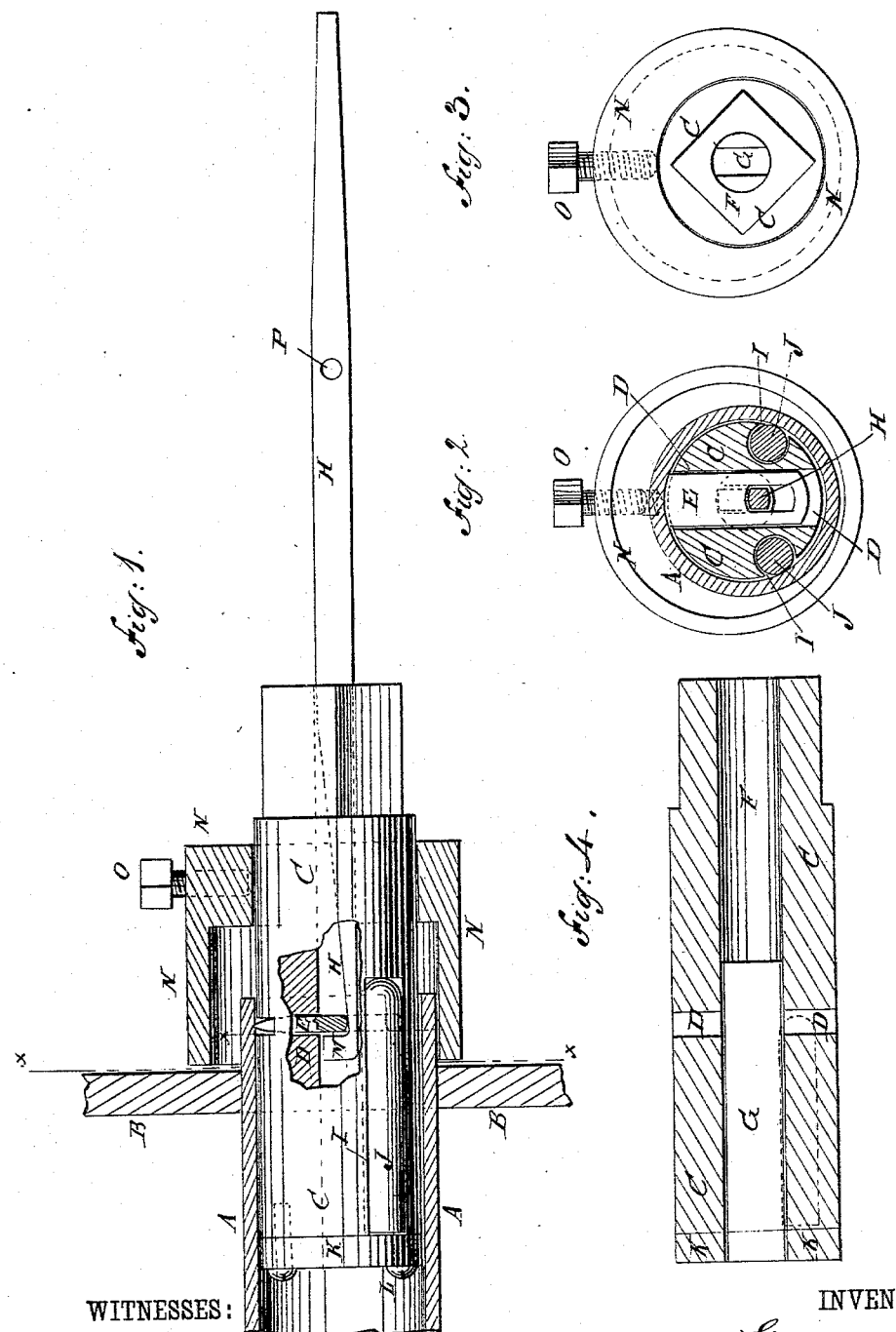
WITNESSES:
Chas. Nida
C. Sedgwick
INVENTOR:
G. W. Odgers
BY Munn & Co
ATTORNEYS.
N. PETERS, Photo-Lithographer, Washington, D. C.

UNITED STATES PATENT OFFICE.

GEORGE WILLIAM ODGERS, OF ELIZABETH, NEW JERSEY.

BOILER-TUBE CUTTER.

SPECIFICATION forming part of Letters Patent No. 325,438, dated September 1, 1885.

Application filed September 26, 1884. (No model.)

*To all whom it may concern:*

Be it known that I, GEORGE WILLIAM ODGERS, of Elizabeth, in the county of Union and State of New Jersey, have invented a new and useful Improvement in Boiler-Tube Cutters, of which the following is a full, clear, and exact description.

Reference is to be had to the accompanying drawings, forming a part of this specification, in which similar letters of reference indicate corresponding parts in all the figures.

Figure 1 is a side elevation, partly in section and part being broken away, of my improvement shown in connection with a section of a boiler-tube and tube-sheet. Fig. 2 is a sectional end elevation of the boiler-tube cutter, taken through the broken line $x\ x\ x$, Fig. 1, and looking to the right. Fig. 3 is an end elevation of the same, the feed-bar being removed. Fig. 4 is a sectional side elevation of the cutter-stock.

The object of this invention is to facilitate cutting out the tubes of steam-boilers and promote simplicity in the construction and convenience in the use of boiler-tube cutters.

The invention consists in the construction and arrangement of parts, as will be hereinafter fully described and claimed.

A represents a tube, and B a tube-sheet of a steam-boiler.

C is the cutter-stock, which is made cylindrical, and has a transverse slot, D, formed through its middle part to receive the cutter E. The outer end of the stock C is squared to receive a wrench for rotating the said stock. The stock C is perforated longitudinally, the outer part, F, of the said perforation, extending from the outer end of the stock nearly to the cutter-slot D, being cylindrical, and the other part, G, being rectangular to serve as a guide to the feed-bar H.

In the sides of the inner part of the stock C and below its center are formed recesses I to receive small rollers J, the said recesses being so formed that the sides of the rollers J will project beyond the outer surface of the stock C to bear against the inner surface of the tube A and take the friction of the back pressure caused by the resistance of the said tube A to the edge of the cutter E. The friction-rollers J are kept in place by a cap-plate, K, secured to the inner end of the stock C by screws L. The cutter E has a slot formed in it to receive the feed-bar H, the forward part of which is tapered, as shown in Fig. 1, to adapt it when driven inward to serve as a wedge to force the cutter E outward against the tube being cut. The taper of the feed-bar H does not extend quite to the forward end of the said bar, a short portion, M, being left to serve as a stop-shoulder to prevent the said feed-bar from being drawn out of the cutter E accidentally.

Upon the outer part of the stock C is placed a tubular collar, N, having a hub which is bored eccentrically and fits upon the outer end of the said stock C, where it is secured in place by a set-screw, O, passing through the said hub and resting against the side of the said stock.

The tubular collar N is designed to be so arranged upon the stock C that the widest part of the recess between it and the said stock will be opposite the cutter E, so that when the instrument is used for cutting off the projecting end of a tube, as illustrated in Fig. 1, the cutter E can cut off the said tube without coming in contact with the said collar.

The collar N is designed to serve as a gage in using the instrument, and can be set to cause the cut to be made at any desired distance from the inner or outer side of the flue-plate. The feed-bar H is driven inward to feed the cutter E outward in making a cut by striking the outer end of the said feed-bar with a hammer.

In the outer part of the feed-bar H is formed a hole, P, to receive a pin, so that the said feed-bar can be driven outward after the cut has been made by striking against the inner side of the said pin with a hammer.

Having thus described my invention, I claim as new and desire to secure by Letters Patent—

1. The combination, in a tube-cutter, of the cylindrical cutter-stock provided with a transverse slot, a cutter therein, a longitudinal aperture and adjusting bar therein, and longitudinal cylindrical recesses extending inward from the outer surface of the stock separate from the longitudinal aperture, and anti-friction-rollers held within said recesses and projecting beyond the face of the cutter-stock, said rollers being of greater diameter than the space between the outer edges of the recesses, whereby the necessity of pivoting the roller is dispensed with, substantially as set forth.

2. A tube-cutter consisting, essentially, in the stock C, provided with transverse slot D, longitudinal angular aperture G, and longitudinal recesses I, independent of the longitudinal aperture, anti-friction rollers J, projecting through said recesses and of greater diameter than the spaces between the outer edges of said recesses, the removable cap-plate K, secured to the forward end of the cutter-stock for holding the rollers in place, the slotted cutter E, and the feed-bar H, substantially as set forth.

3. A tube-cutter consisting of the cylindrical stock C, squared at one end and provided with transverse slot D, slotted cutter E, longitudinal central aperture made angular at G, longitudinal recesses I in the outer face of said stock and separate from the longitudinal recess, the anti-friction rollers J therein and of larger diameter than the space between the outer edges of the recesses, the removable end-plate K, the feed-bar H, inclined at its forward end and passed through the slot of the cutter, and the tubular adjustable eccentric collar N, substantially as set forth.

GEORGE WILLIAM ODGERS.

Witnesses:
DAVID R. STEDMAN,
EDWARD K. DRAKE.